US010954782B2

(12) United States Patent
Wilson et al.

(10) Patent No.: US 10,954,782 B2
(45) Date of Patent: Mar. 23, 2021

(54) FUNCTIONAL EARTH MODEL PARAMETERIZATION FOR RESISTIVITY INVERSION

(71) Applicant: Halliburton Energy Services, Inc., Houston, TX (US)

(72) Inventors: Glenn Andrew Wilson, Singapore (SG); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 656 days.

(21) Appl. No.: 15/531,949

(22) PCT Filed: Jan. 7, 2015

(86) PCT No.: PCT/US2015/010493
§ 371 (c)(1),
(2) Date: May 31, 2017

(87) PCT Pub. No.: WO2016/111685
PCT Pub. Date: Jul. 14, 2016

(65) Prior Publication Data
US 2017/0321545 A1  Nov. 9, 2017

(51) Int. Cl.
*G01V 99/00* (2009.01)
*E21B 49/00* (2006.01)
(Continued)

(52) U.S. Cl.
CPC ............ *E21B 49/003* (2013.01); *E21B 7/04* (2013.01); *E21B 41/0092* (2013.01);
(Continued)

(58) Field of Classification Search
CPC .... E21B 49/003; E21B 44/00; E21B 41/0092; E21B 7/04; E21B 47/12; E21B 47/024;
(Continued)

(56) References Cited

U.S. PATENT DOCUMENTS 6,430,509 B1    8/2002  Yin et al.
6,885,943 B2 *  4/2005  Bittar .................. G01V 3/38
                                                    702/7
(Continued)

FOREIGN PATENT DOCUMENTS

CN    1066510 A    11/1992
CN    1325494 A    12/2001
(Continued)

OTHER PUBLICATIONS

Chunduru et al., 2-D resistivity inversion using spline parameterization and simulated annealing, 1996, Geophysics, vol. 61, No. 1, p. 151-161.*
(Continued)

*Primary Examiner* — Juan C Ochoa
(74) *Attorney, Agent, or Firm* — Benjamin Ford; Baker Botts L.L.P.

(57) ABSTRACT

An example method for modeling a geological formation includes receiving a set of measurements from an electromagnetic logging tool and representing at least one characteristic of the geological formation as at least one continuous spatial function. At least one coefficient of the at least one continuous spatial function may be determined based, at least in part, on the set of measurements. At least one characteristic of the geological formation may be determined based, at least in part, on the at least one continuous spatial function.

18 Claims, 5 Drawing Sheets

(51) Int. Cl.
| | |
|---|---|
| *G01V 3/38* | (2006.01) |
| *E21B 7/04* | (2006.01) |
| *E21B 41/00* | (2006.01) |
| *E21B 44/00* | (2006.01) |
| *G01V 3/28* | (2006.01) |
| *E21B 47/024* | (2006.01) |
| *E21B 47/12* | (2012.01) |

(52) U.S. Cl.
CPC .............. *E21B 44/00* (2013.01); *G01V 3/28* (2013.01); *G01V 3/38* (2013.01); *G01V 99/005* (2013.01); *E21B 47/024* (2013.01); *E21B 47/12* (2013.01)

(58) Field of Classification Search
CPC ........ E21B 49/00; G01V 99/005; G01V 3/28; G01V 3/38
USPC ...................................................... 703/10, 2
See application file for complete search history.

(56) References Cited

U.S. PATENT DOCUMENTS

| | | | |
|---|---|---|---|
| 6,885,947 B2 | 4/2005 | Xiao et al. | |
| 7,295,928 B2 | 11/2007 | Hassan et al. | |
| 7,382,135 B2* | 6/2008 | Li | G01V 3/30 324/338 |
| 7,612,566 B2* | 11/2009 | Merchant | G01V 3/28 324/339 |
| 7,630,872 B2 | 12/2009 | Xia et al. | |
| 7,778,811 B2 | 8/2010 | Kelfoun | |
| 7,991,553 B2* | 8/2011 | Alumbaugh | G01V 3/30 324/323 |
| 8,200,465 B2 | 6/2012 | Suarez-Rivera et al. | |
| 8,571,797 B2 | 10/2013 | Wu et al. | |
| 9,536,022 B1* | 1/2017 | Tertois | G06F 30/20 |
| 10,324,219 B2* | 6/2019 | Wu | G01V 3/38 |
| 2004/0073371 A1 | 4/2004 | Haugland | |
| 2006/0195264 A1 | 8/2006 | El Askary | |
| 2011/0054857 A1 | 3/2011 | Moguchaya | |
| 2011/0308811 A1* | 12/2011 | Ghayour | G01V 1/30 166/369 |
| 2013/0069656 A1 | 3/2013 | Haramboure et al. | |
| 2013/0140037 A1 | 6/2013 | Sequeira, Jr. et al. | |
| 2014/0129194 A1* | 5/2014 | Zhdanov | G01V 99/005 703/2 |
| 2014/0239960 A1 | 8/2014 | Habashy et al. | |
| 2017/0096887 A1* | 4/2017 | Wilson | G01V 3/30 |

FOREIGN PATENT DOCUMENTS

| | | |
|---|---|---|
| CN | 1573013 A | 2/2005 |
| CN | 1632617 A | 6/2005 |
| CN | 102678106 A | 9/2012 |
| WO | 2011/082012 A2 | 7/2011 |
| WO | 2012/103313 A2 | 8/2012 |
| WO | 2013/066297 A1 | 5/2013 |
| WO | 2014/018022 A1 | 1/2014 |
| WO | 2014/025354 A1 | 2/2014 |
| WO | 2014/035378 A1 | 3/2014 |

OTHER PUBLICATIONS

Rawlinson et al., Inversion of seismic refraction and wide-angle reflection traveltimes for 3-D layered crustal structure, 2001, Geophys. J. Int., 145, pp. 381-400.*

Rawlinson and Sambridge, "Seismic traveltime tomography of the crust and lithosphere", 2003, Advances in Geophysics 46, 90 pages.*

Brodie, Green, and Munday, Constrained inversion of RESOLVE electromagnetic data—Riverland, South Australia, Sep. 2004, Cooperative Research Centre for Landscapes, Environment and Mineral Exploration Open File Report 175, pp. 1-42.*

Brodie, Green, and Munday, Calibration of RESOLVE airborne electromagnetic data—Riverland and East Tintinara, South Australia, Sep. 2004, 22 pages.*

Anderson, Barbara Ina. Modeling and inversion methods for the interpretation of resistivity logging tool response. Diss. TU Delft, Delft University of Technology, 2001.

Hagiwara, T. "Interferometric processing to look-ahead bed boundary and measure distance and resistivity." SEG Technical Program Expanded Abstracts 2013. Society of Exploration Geophysicists, 2013. 534-537.

Pardo, David, et al. "Fourier series expansion in a non-orthogonal system of coordinates for the simulation of 3D-DC borehole resistivity measurements." Computer Methods in Applied Mechanics and Engineering 197.21 (2008): 1906-1925.

Abubakar, Aria, et al. "A 3D parametric inversion algorithm for triaxial induction data." Geophysics 71.1 (2006): G1-G9.

Brodie, Ross, and Malcolm Sambridge. "A holistic approach to inversion of frequency-domain airborne EM data." Geophysics 71.6 (2006): G301-G312.

Brodie, Ross, and Malcolm Sambridge. "Holistic inversion of frequency-domain airborne electromagnetic data with minimal prior information." Exploration Geophysics 40.1 (2009): 8-16.

International Search Report and Written Opinion issued in related PCT Application No. PCT/US2015/010493 dated Sep. 21, 2015, 14 pages.

International Preliminary Report on Patentability issued in related Application No. PCT/US2015/010493, dated Jul. 20, 2017 (13 pages).

Office Action in related Chinese Patent Application No. 201580066440X dated Oct. 9, 2019, 18 pages.

* cited by examiner

FUNCTIONAL EARTH MODEL PARAMETERIZATION FOR RESISTIVITY INVERSION

CROSS-REFERENCE TO RELATED APPLICATION

The present application is a U.S. National Stage Application of International Application No. PCT/US2015/010493 filed Jan. 7, 2015, which is incorporated herein by reference in its entirety for all purposes.

BACKGROUND

The present disclosure relates generally to well drilling operations and, more particularly, to functional earth model parameterization for inversion of resistivity data.

Hydrocarbons, such as oil and gas, are produced from subterranean reservoir formations that may be located onshore or offshore. The processes involved in recovering hydrocarbons from a reservoir are becoming increasingly complex. Typically, subterranean production involves a number of different steps such as, for example, drilling a wellbore at a desired well site and optimizing well placement within the reservoir, treating the wellbore to optimize production of hydrocarbons, and performing the necessary steps to produce, process and transport the hydrocarbons from the reservoir.

Measurements of the geological formation may be made throughout the operations using electromagnetic logging techniques. One example technique includes the use of an induction logging tool that can be used to determine resistivity (or its inverse, conductivity) of the geological formations in the proximity of the borehole. Generally, at discrete measurement points within the borehole, a transmitter of the induction logging tool transmits an electromagnetic signal that passes through the geological formation around the borehole and induces a signal in one or more receivers in the induction logging tool. The properties of the signal received, such as its amplitude and/or phase, are influenced by the formation resistivity. Analyzing these signals to determine the formation resistivity and other properties is collectively known as formation evaluation.

The measured signal characteristics and/or formation properties calculated therefrom may be recorded as a function of the tool's depth or position in the borehole, yielding a formation log that can be used to analyze the formation. Generally, the formation log is processed using a numerical inversion to determine characteristics of the formation. The inversion involves determining earth model parameter values using an algorithm referred to as the one-dimensional (1D) inversion, which produces a separate 1D resistivity model at each measurement point. These point-by-point 1D resistivity models, however, typically introduce geologically unrealistic artefacts due to over-fitting of data below the noise level or the absence of constraints which limit inversion models to geologically plausible solutions.

BRIEF DESCRIPTION OF THE DRAWING(S)

Some specific exemplary embodiments of the disclosure may be understood by referring, in part, to the following description and the accompanying drawings.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION OF THE DISCLOSURE

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would, nevertheless, be a routine undertaking for those of ordinary skill in the art having the benefit of the present disclosure.

To facilitate a better understanding of the present disclosure, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection or monitoring wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like. "Measurement-while-drilling" ("MWD") is the term generally used for measuring conditions downhole concerning the movement and location of the drilling assembly while the drilling continues. "Logging-while-drilling" ("LWD") is the term generally used for similar techniques for formation evaluation. Devices and methods in accordance with certain embodiments may be used in one or more of wireline (including wireline, slickline, and coiled tubing), downhole robot, MWD, and LWD operations.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

The terms "couple" or "couples" as used herein are intended to mean either an indirect or a direct connection. Thus, if a first device couples to a second device, that connection may be through a direct connection, or through an indirect mechanical, electromagnetic, or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections. Finally, the term "fluidically coupled" as used herein is intended to mean that there is either a direct or an indirect fluid flow path between two components.

Figure 1:
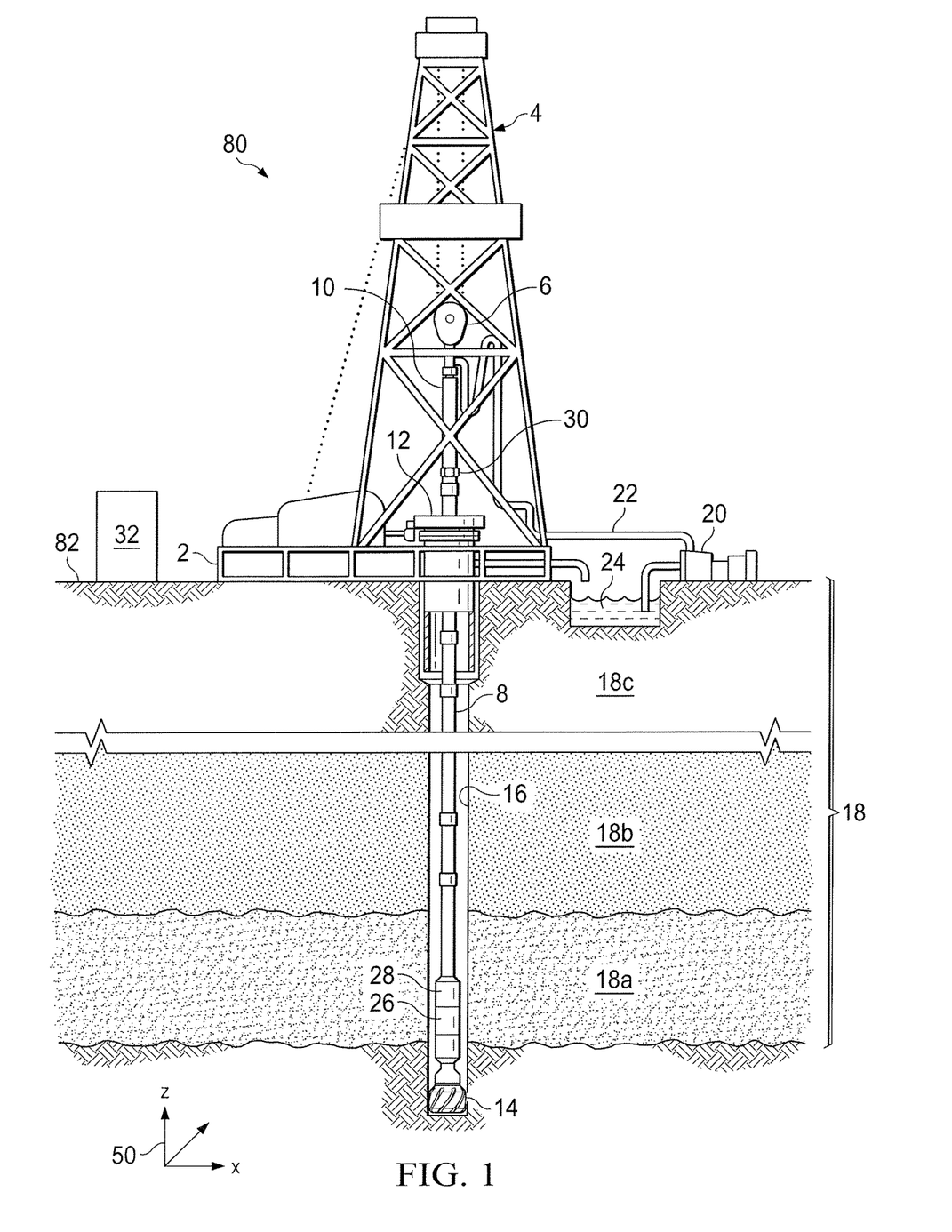
FIG. 1 is a diagram of an example subterranean drilling system, according to aspects of the present disclosure.

FIG. 1 is a diagram of a subterranean drilling system 80, according to aspects of the present disclosure. The drilling system 80 comprises a drilling platform 2 positioned at the surface 82. In the embodiment shown, the surface 82 comprises the top of a formation 18 containing one or more rock strata or layers 18a-c, and the drilling platform 2 may be in contact with the surface 82. In other embodiments, such as in an off-shore drilling operation, the surface 82 may be separated from the drilling platform 2 by a volume of water.

The drilling system 80 comprises a derrick 4 supported by the drilling platform 2 and having a traveling block 6 for raising and lowering a drill string 8. A kelly 10 may support the drill string 8 as it is lowered through a rotary table 12. A drill bit 14 may be coupled to the drill string 8 and driven by a downhole motor and/or rotation of the drill string 8 by the rotary table 12. As bit 14 rotates, it creates a borehole 16 that passes through one or more rock strata or layers 18. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole 16 into the pit 24 and aids in maintaining integrity or the borehole 16.

The drilling system 80 may comprise a bottom hole assembly (BHA) coupled to the drill string 8 near the drill bit 14. The BHA may comprise various downhole measurement tools and sensors and LWD and MWD elements, including an induction logging tool 26. As the bit extends the borehole 16 through the formations 18, the tool 26 may collect measurements relating to borehole 16 and the resistivity of the formation 18. The tool 26 may also collect measurements regarding the conductivity, permittivity, permeability, chargeability and other induced polarization parameters of the formation 18. In certain embodiments, the orientation and position of the tool 26 may be tracked using, for example, an azimuthal orientation indicator, which may include magnetometers, inclinometers, and/or accelerometers, though other sensor types such as gyroscopes may be used in some embodiments.

The tools and sensors of the BHA including the resistivity logging tool 26 may be communicably coupled to a telemetry element 28. The telemetry element 28 may transfer measurements from tool 26 to a surface receiver 30 and/or to receive commands from the surface receiver 30. The telemetry element 28 may comprise a mud pulse telemetry system, and acoustic telemetry system, a wired communications system, a wireless communications system, or any other type of communications system that would be appreciated by one of ordinary skill in the art in view of this disclosure. In certain embodiments, some or all of the measurements taken at the tool 26 may also be stored within the tool 26 or the telemetry element 28 for later retrieval at the surface 82.

In certain embodiments, the drilling system 80 may comprise a surface control unit 32 positioned at the surface 82. As used herein, a control unit may include an information handling system or any other device that contains at least one processor communicably coupled to a non-transitory computer readable memory device containing a set of instructions that when executed by the processor, cause it to perform certain actions. Example processors include microprocessors, microcontrollers, digital signal processors (DSP), application specific integrated circuits (ASIC), or any other digital or analog circuitry configured to interpret and/or execute program instructions and/or process data. In certain embodiments, the surface control unit 32 may comprise a plurality of information handling systems arranged in a serial or parallel architecture to receive and process downhole measurement data.

In the embodiment shown, the surface control unit 32 is communicably coupled to the surface receiver 30 to receive measurements from the tool 26 and/or transmit commands to the tool 26 though the surface receiver 30. The surface control unit 32 may also receive measurements from the tool 26 when the tool 26 is retrieved at the surface 102. The surface control unit 32 may process some or all of the measurements from the tool 26, as described in detail below, to determine characteristics of the formation 18, including the locations of boundaries between and the resistivity of the rock strata or layers 18a-c. In certain embodiments, some or all of the processing steps may also be performed at an information handling system at a remote location from the drilling system.

Figure 2:
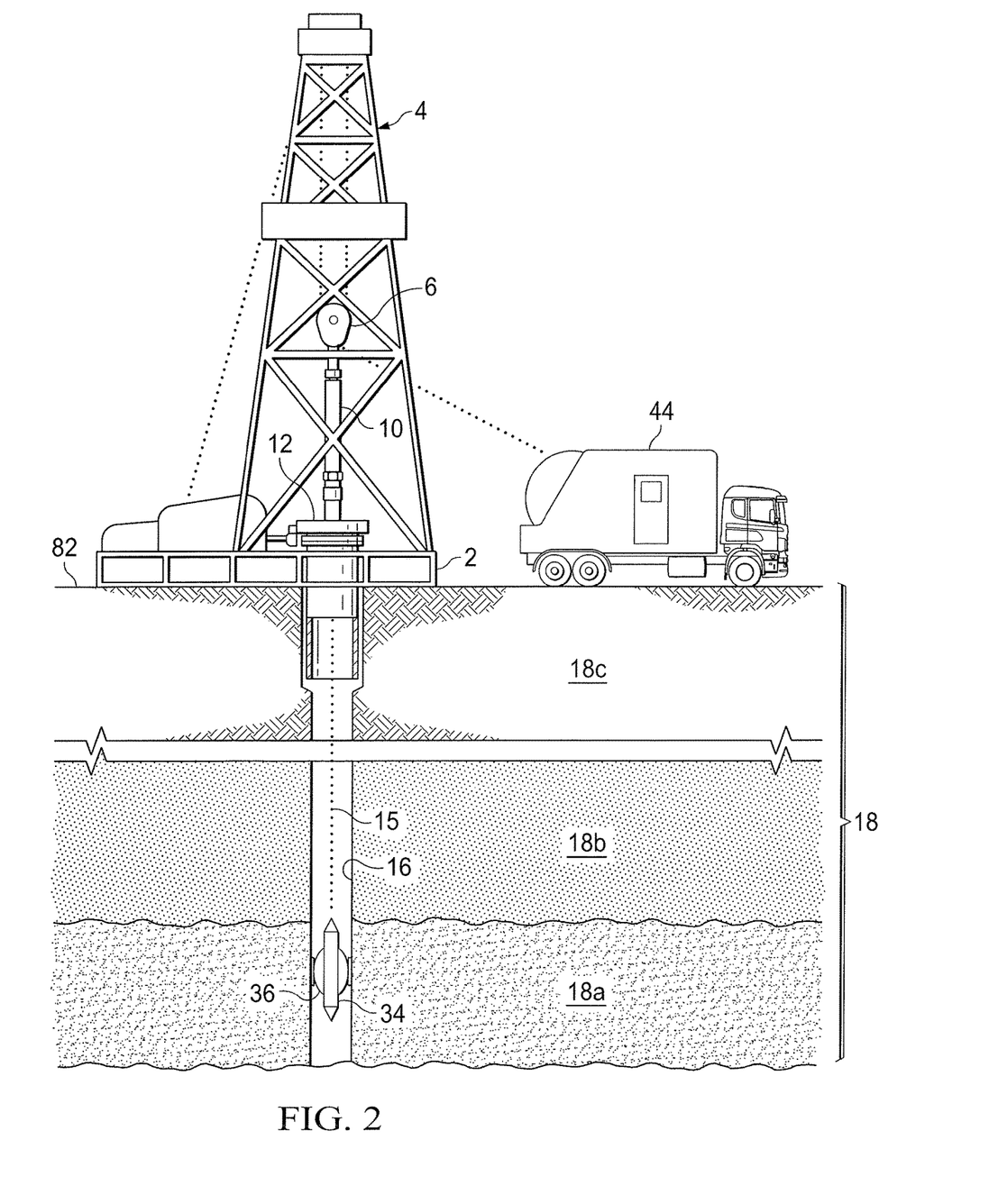
FIG. 2 is a diagram of an example subterranean drilling system with the drill string removed, according to aspects of the present disclosure.

At various times during the drilling process, the drill string 8 may be removed from the borehole 16 as shown in FIG. 2. Once the drill string 8 has been removed, measurement/logging operations can be conducted using a wireline tool 34, i.e., an instrument that is suspended into the borehole 16 by a cable 15 having conductors for transporting power to the tool and telemetry from the tool body to the surface 102. The wireline tool 34 may comprise an induction logging tool 36, similar to the tool 26 described above. The tool 36 may be communicatively coupled to the cable 15. A logging facility 44 (shown in FIG. 2 as a truck, although it may be any other structure) may collect measurements from the tool 36, and may include computing facilities (including, e.g., a control unit/information handling system) for controlling, processing, storing, and/or visualizing the measurements gathered by the tool 36. The computing facilities may be communicatively coupled to the tool 36 by way of the cable 15. In certain embodiments, the control unit 32 may serve as the computing facilities of the logging facility 44.

Electromagnetic logging tools, such as those described above, may take periodic measurements at different depths and times as they progress into the formation. For example, continuous measurements may be stacked and binned at 0.5 foot intervals as the logging tool moves forward within the formation 18 in the borehole 16. Those measurements may include information regarding one of more resistivity parameters of each layer 18a-18c, the location of the boundaries between the layers 18a-18c (also called the "distance to bed boundary"), and the relative azimuth and dip between the logging tool and the layer boundaries. Inversions are used to determine the resistivity values, distances to bed boundaries, and other downhole characteristics from the measurements. The remainder of this disclosure will describe inversion and modeling in terms of resistivity for ease of explanation, but the operations and modeling techniques are equally applicable to other electromagnetic model parameters such as permittivity and chargeability as well.

Figure 3:
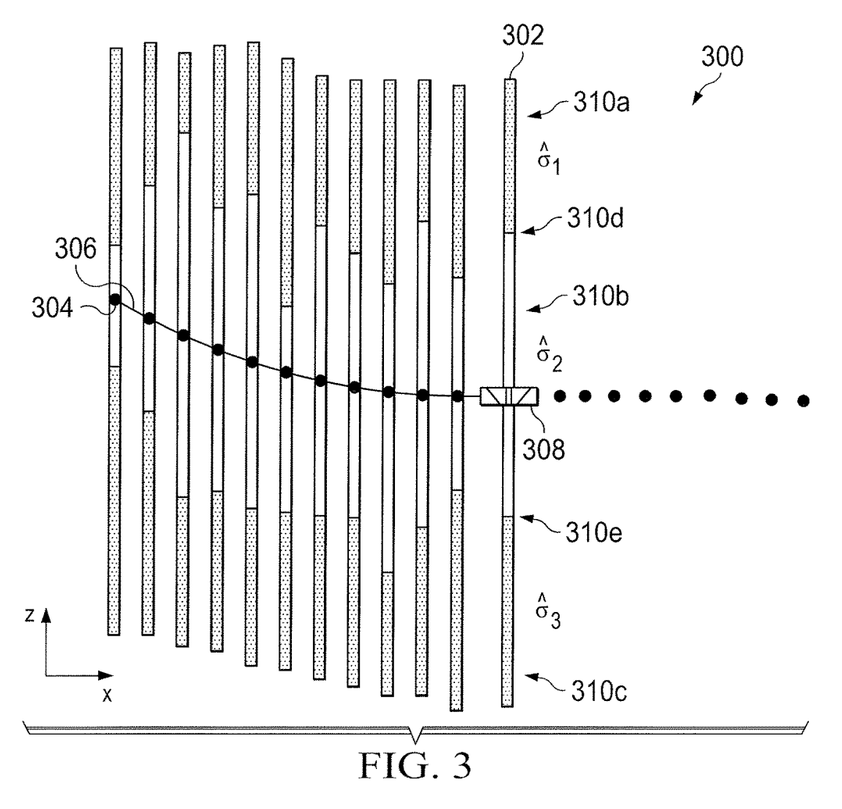
FIG. 3 is a diagram of an existing inversion model.

As illustrated in FIG. 3, one existing inversion operation is a parametric inversion that generates 1D earth model 302 at each measurement point 304 from the resistivity logging tool 308 along the trajectory 306. In the embodiment shown, each of the models 302 include five parameters that correspond to different formation characteristics of interest, including the resistivity $\sigma_1$ of the formation layer 310a, the resistivity $\sigma_2$ of the formation layer 310b, the resistivity $\sigma_3$ of the formation layer 310c, the location of the boundary 310d between layers 310a and 310b, and the location of the boundary 310e between layers 310b and 310c. Generating each model includes receiving the measurements collected by the logging tool at the corresponding measurement point and applying a 1D inversion to optimize values for each of the five earth model parameters. The 1D earth models 302 are then "stitched" together to foam a continuous two-dimensional (2D) image of the geological formation. Generally, the operation described above is computationally intense because separate 1D inversions are run at each measurement point. Additionally, if the earth model parameters are not constrained in some capacity by adjacent earth model parameters, the operation can generate geologically unrealistic artefacts, such as the discontinuities shown in the location of the bed boundaries 310d and 310e in adjacent 1D earth models. Some existing processing techniques provide such lateral constraints, but this further increases the computational complexity of the inversion.

According to aspects of the present disclosure, logging tool measurements may be processed to determine geological formation characteristics using an earth model that is parameterized by one or more continuous spatial functions that allow for a continuous image of the formation to be generated without first calculating and stitching parameters from 1D models at each measurement point. This may reduce the algorithmic complexity needed to determine geological formation characteristics as well as the number of inversion operations that must be performed to generate the earth model, both of which reduce the computational load of the calculations. Additionally, in certain embodiments, the reduced computational load facilitates real-time computation of geological formation characteristics, which may increase the overall performance of the drilling operation.

Figure 4:
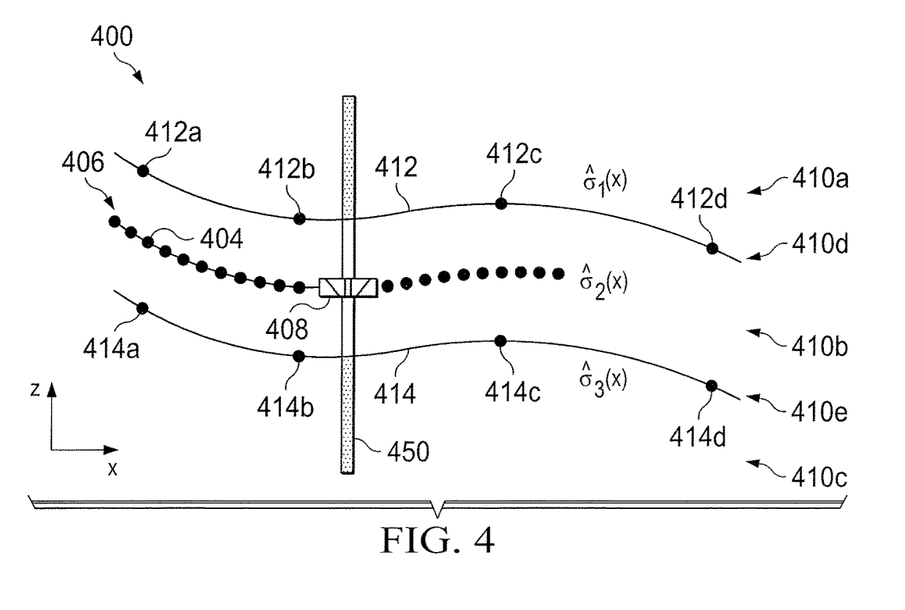
FIG. 4 is diagram illustrating a formation model described by one or more continuous spatial functions, according to aspects of the present disclosure.

FIG. 4 is diagram illustrating a 2D earth model 400 described by one or more 1D continuous spatial functions, according to aspects of the present disclosure. Example continuous spatial functions include, but are not limited to, spline, polynomial, and series functions. Similar to FIG. 3, the earth model 400 represents a formation with three formation layers 410a-c and two boundaries 410d-e in which a logging tool 408 is traveling within the geological formation along trajectory 406 and collecting measurements at measurements points 404. Unlike the model in FIG. 3, however, the formation characteristics of interest for the layers 410a-c and boundaries 410d-e are represented by continuous functions, rather than discrete model parameters separately calculated at each measurement point 404 of the tool 408. Specifically, the resistivities of the formation layers 410a-c are represented respectively by continuous functions $\sigma_1(x)$, $\sigma_2(x)$, and $\sigma_3(x)$, with x corresponding to a lateral position within the formation; and the boundaries 410d and 410e are represented respectively by continuous functions illustrated by lines 412 and 414.

In the embodiment shown, each of the continuous functions comprises a separate spline. As used herein, a spline may comprise a numeric function that is piecewise-defined by polynomial functions. Example splines include, but at not limited to, linear, bilinear, cubic, and B-splines. As can be seen, the spline 412 corresponding to boundary 410d comprises polynomial segments joined at spline knots or nodes 412a-d. Similarly, the spline 414 corresponding to boundary 410e comprises polynomial segments joined at spline knots or nodes 414a-d, located at similar locations along the x-axis of the model 400 as the nodes 412a-d, and spaced apart equal distances from the trajectory 406 of the tool 408 on the y-axis of the model 400. The number and placement of spline nodes may be selected based, at least in part, on the length of expected variations within the formation and the measurement range of the resistivity logging tool 408. Additionally, the spline nodes need not be equidistant, and in certain embodiments may be dynamically modified.

In certain embodiments, the continuous functions $\sigma_1(x)$, $\sigma_2(x)$, and $\sigma_3(x)$ may represent one or more resistivity or conductivity tensors. Example tensors can consist of horizontal and vertical conductivities, both of which may be represented as splines to enforce lateral continuity and to represent a uniaxial (or transverse isotropic) medium. Other example tensors can consist of three conductivities, each associated with a spline to represent a biaxial medium. In certain embodiments, the tensors may comprise full tensors with nine conductivities, each functionally represented as splines. The full tensor can be expressed as the Euler rotation of a diagonal (uniaxial or biaxial) conductivity tensor.

Each of the spline nodes in the model 400 may have associated spline coefficients. The spline coefficients may define, in part, the splines to which the spline nodes correspond. In certain embodiments, the spline coefficients may be determined from the inversion of measurements generated by the logging tool 408, by using any well-known inversion algorithm (e.g., conjugate gradient, Gauss-Newton) and/or choice of regularization. Generally, any uncertainty in the spline coefficient calculations will be lower for the spline nodes behind the tool 408 than for the spline nodes in front of the tool 408 given that measurements were actually taken by the tool 408 near those locations. That said, the spline coefficients for the spline nodes ahead of the tool 408 may be extrapolated from the spline coefficients behind and nearby the tool 408. In the embodiment shown, for example, the spline coefficient associated with nodes 412c and 412d may be extrapolated from the spline coefficients associated with nodes 412a and 412b. This may allow for "look ahead" functionality in which formation characteristics of interest ahead of the tool 408 are determined, which is of particular interest in LWD applications where a steering assembly controls the direction of the drilling assembly.

With respect to the model 400 in FIG. 4, the value of a spline surface at any lateral position (which corresponds to the value of the formation characteristic of interest at that lateral position) may be determined as the weighted sum of the four adjacent spline coefficients using Equation (1):

$$B_{ik}(x) = \Sigma_{p=i-1}^{i+2} c_{pk} w_{pk}(x)$$

where $c_{pk}$ and $w_{pk}(x)$ are the spline coefficients and spline weights, respectively, for the node at the $p^{th}$ node on the $k^{th}$ spline. The spline weights $w_{pk}(x)$ may be a function only of the lateral position of spline nodes, therefore remaining constant during an inversion. The sensitivities (e.g., Frechet derivatives or Jacobians) of a given spline with respect to the spline coefficients are shown in Equation (2):

$$\frac{\partial B_{ik}(x,z)}{\partial c_{pk}} = \begin{cases} w_{pk}(x,z), & i-1 \leq p \leq i+2 \\ 0, & \text{otherwise} \end{cases}$$

The sensitivities (e.g., Frechet derivatives or Jacobians) of measured data $d_j(x,z)$ to the spline coefficients may be given by the product rule in Equation (3):

$$\frac{\partial d_a(x,z)}{\partial c_{pk}} = \frac{\partial d_a(x,z)}{\partial B_{ik}(x,z)} \times \frac{\partial B_{ik}(x,z)}{\partial c_{pk}}$$

with the sensitivities $$\frac{\partial d_a(x,z)}{\partial B_{ik}(x,z)}$$

being calculated using semi-analytical, finite-difference, or adjoint operator methods.

Once the spline coefficients are determined from a set of measurements, earth models may be generated at any position by evaluating the splines. For example, the resistivity value of the formation layer 410a at a lateral position a along the x-axis of the model 400 may be determined by evaluating the corresponding spline function at that lateral position. The values for the other formation characteristics of interest may be identified in a similar manner. Investigating all of the splines at a single lateral position will effectively generate a 1D earth model (e.g., model 450) similar to the 1D earth models described with reference to FIG. 3. Likewise, investigating all of the splines at all of the lateral positions will generate a 2D earth model. Three-dimensional (3D) earth models may also be generated, as will be described below. Notably, the selected lateral positions are not dependent on a measurement point 404 of the tool 408, nor does it require an inversion algorithm corresponding to that position. Rather, the inversion algorithm determines the spline coefficients, and this is sufficient to fully characterize the formation characteristics of interest. As will be appreciated by one of ordinary skill in the art in view of this disclosure, simulating the logging tool responses from the earth models generated from the splines may consist of any combination of analytical, semi-analytical, finite difference, finite-volume, boundary-element, and/or integral equation methods implemented in Cartesian, cylindrical, and/or polar coordinates.

Figure 5:
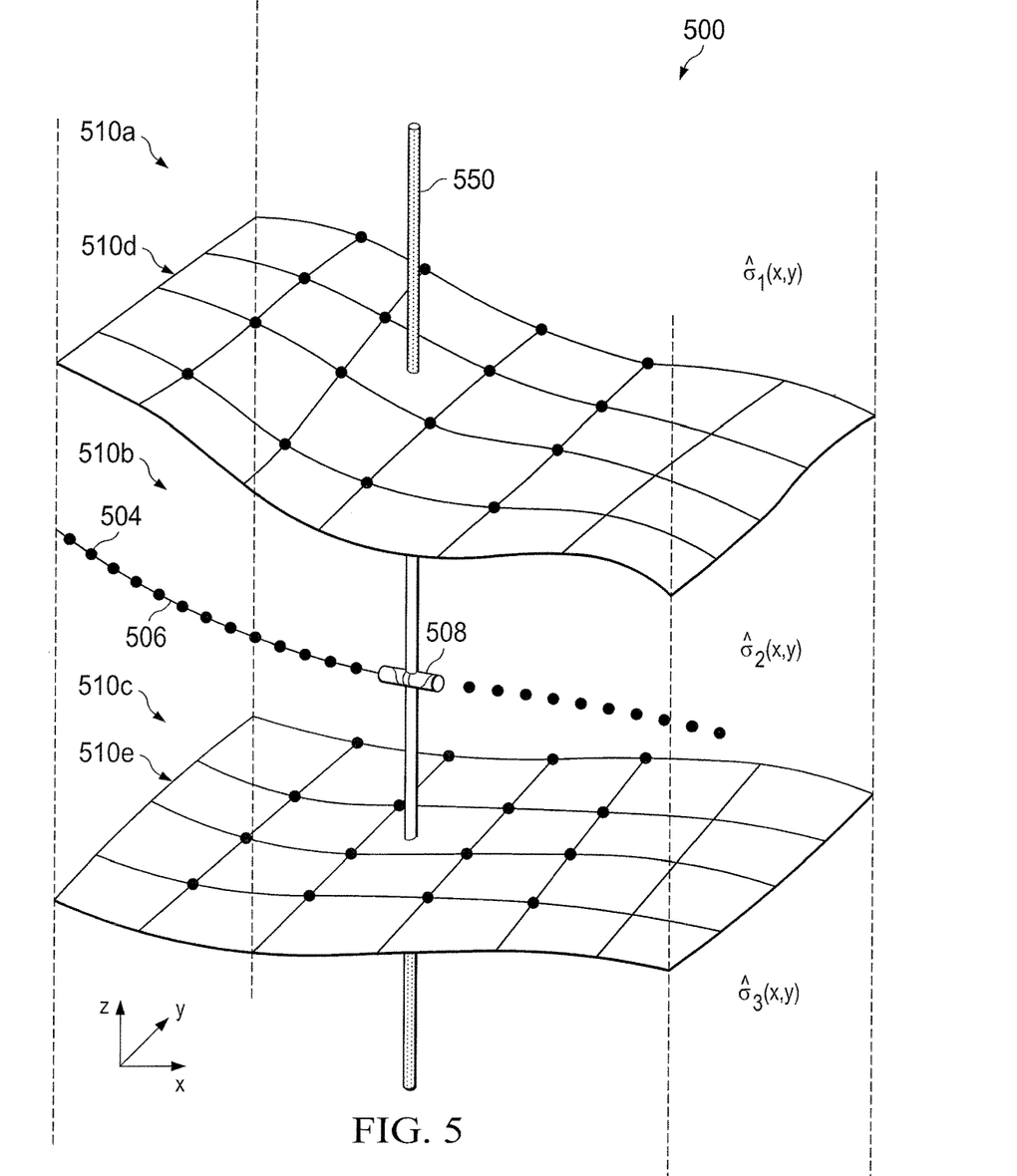
FIG. 5 is diagram illustrating another formation model described by one or more continuous spatial functions, according to aspects of the present disclosure.

FIG. 5 is diagram illustrating a 3D formation model 500 described by one or more 2D continuous spatial functions, according to aspects of the present disclosure. Similar to FIG. 4, the model 500 represents a formation with three formation layers 510a-c and two boundaries 510d-e in which a logging tool 508 is traveling within the formation along trajectory 406 and collecting measurements at measurement points 404, with formation characteristics of interest for the layers 510a-c and boundaries 510d-e being represented by continuous functions spanning the geological formation. Unlike the model in FIG. 4, however, the continuous spatial functions may comprise of 2D splines that describe the model 500 along both the x- and y-axes. Specifically, the resistivities of the formation layers 510a-c are represented respectively by 2D spline meshes $\sigma_1(x, y)$, $\sigma_2(x, y)$, and $\sigma_3(x, y)$, with x and y corresponding to coordinates within the formation along the x- and y-axes; and the boundaries 510d and 510e are represented respectively by 2D spline meshes illustrated as planes 512 and 514. In the embodiment shown, the 2D spline mesh 512 corresponding to boundary 510d includes polynomial segments joined by a matrix of spline knots or nodes. Similarly, the 2D spline mesh 514 corresponding to boundary 510e comprises polynomial segments joined at spline knots or nodes located at similar locations along the x- and y-axes of the model 500 as the nodes of the 2D spline mesh 512, and spaced apart equal distances from the trajectory 506 of the tool 508 on the z-axis of the model 500.

The spline coefficients may be calculated in a similar way to that described above with respect to FIG. 4. Additionally, earth models may be generated from the splines by evaluating the 2D splines to identify the value of a spline at any x and y coordinate (which may correspond to the value of the formation characteristic of interest at that x and y coordinate) based on a weighted sum of the four adjacent node coefficients using Equation (4):

$$B_{ikj}(x,y) = \Sigma_{p=i-1}^{i+2} \Sigma_{q=j-1}^{j+2} c_{qpk} w_{qpk}(x,y)$$

where $c_{qpk}$ and $w_{qpk}(x,y)$ are the spline coefficients and spline weights, respectively, for the node at the $p^{th}$ and $q^{th}$ nodes on the $k^{th}$ spline mesh. The spline weights $w_{qpk}(x,y)$ may be a function only of the coordinates of the spline nodes, therefore remaining constant during an inversion. The sensitivities (e.g., Frechet derivatives or Jacobians) of a given spline mesh with respect to the spline coefficients are shown in Equation (5):

$$\frac{\partial B_{ijk}(x,z)}{\partial c_{qpk}} = \begin{cases} w_{qpk}(x,z), & i-1 \leq p \leq i+2, j-1 \leq q \leq j+2 \\ 0, & \text{otherwise} \end{cases}$$

The sensitivities (e.g., Frechet derivatives or Jacobians) of measured data $d_j(x,z)$ to the spline coefficients may be given by the product rule in Equation (6):

$$\frac{\partial d_a(x,z)}{\partial c_{qpk}} = \frac{\partial d_a(x,z)}{\partial B_{ijk}(x,z)} \times \frac{\partial B_{ijk}(x,z)}{\partial c_{qpk}}$$

with the sensitivities $$\frac{\partial d_a(x,z)}{\partial B_{ijk}(x,z)}$$

being calculated using semi-analytical, finite-difference, or adjoint operator methods.

Once the spline coefficients for the spline meshes are determined for a set of measurements, earth models may be generated at any position by interrogating the splines. These may include 1D earth models (e.g., model 550) at a specific x and y coordinate, or 2D earth models that, for example, include formation characteristics of interest from a slice through the model at specific x and y coordinates. Additionally, a 3D earth model may be generated by investigating the spline meshes for all x and y coordinates.

In certain embodiments, the type of continuous spatial functions applied to an earth model may depend on the complexity of the measurements generated by the downhole tool. A dynamic misfit functional may be applied to switch the continuous spatial function used to parameterize the earth model to the continuous spatial function best able to represent the actual measurement data. This may include increasing the complexity of the interpolation function (e.g., piece-wise constant to piece-wise linear to polynomial/spline) or decreasing the complexity of the interpolation function (e.g., to polynomial/spline to piece-wise linear to piece-wise constant).

Figure 6:
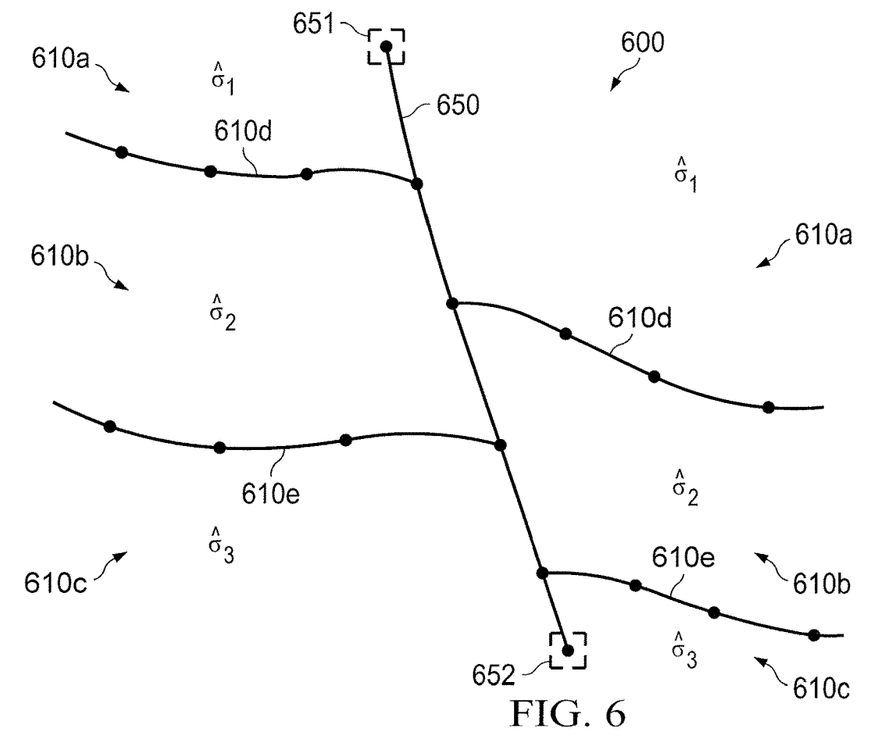
FIG. 6 is a diagram illustrating an example earth model in which layers of the formation are discontinuous by a fault, according to aspects of the present disclosure.

In certain embodiments, a formation may include discontinuities, such as faults, that are not adequately represented by the smooth continuous interpolation functions described above. In those instances, the continuous function models described above may be adapted to include a discontinuity to allow a more accurate characterization of the formation using the continuous function. FIG. 6 is a diagram illustrating an example 2D earth model in which layers of the formation are discontinuous by a fault, according to aspects of the present disclosure. Specifically, the model 600 comprises three formation layers 610a-c and two boundaries 610d and 610e discontinuous at a fault 650. In the embodiment shown, separate splines/nodes represent the layers 610a-c and boundaries 610d-e on either side of the fault, with each of the splines being knotted to the fault 650. The fault 650 is characterized by two nodes 651 and 652. In 2D earth models, the fault may be represented as a line. In 3D earth models, the fault may be represented as a plane. The fault 650 may be introduced ahead, at, or behind the tool position when processing the measurements from the tool. Additionally, other types of geological discontinuities and complexities may be modeled in addition to faults.

Once measurement data is received, spline coefficients for the spline nodes and the nodes 651 and 652 for the fault 650 may be determined through an inversion operation. Notably, the inclusion of the fault 650 increases the complexity of the earth model 600 by at least the nodes 651 and 652 and the extra node for each spline on the fault. That said, the overall parametric load to fully characterize a formation is still significantly less than a point-by-point parametric inversion.

Figure 7:
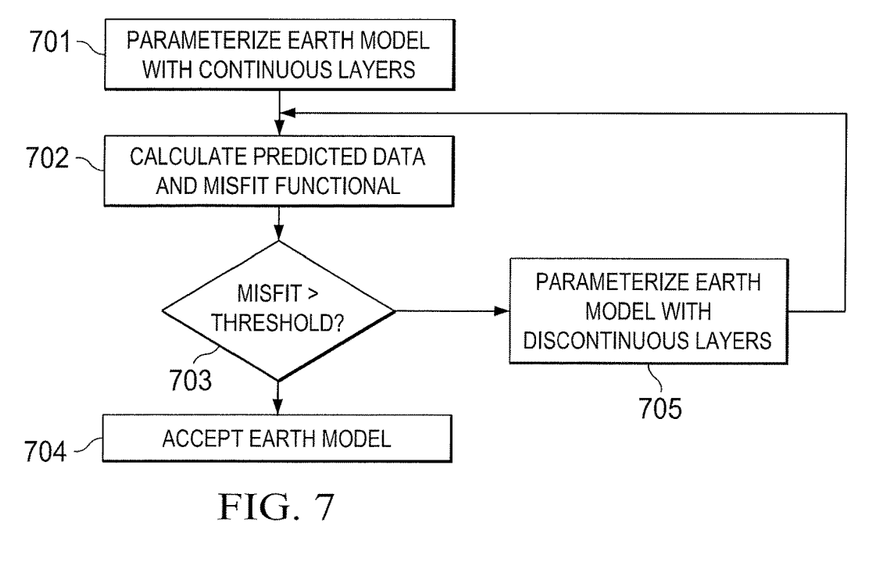
FIG. 7 is an example flow diagram illustrating a process in which a discontinuity is added to a formation model, according to aspects of the present disclosure.

In certain embodiments, the fault 650 or other discontinuity may be introduced into an earth model via analysis of a misfit functional described above. FIG. 7 is an example flow diagram illustrating a process whereby a discontinuity is added to an earth model, according to aspects of the present disclosure. At step 701 an earth model with continuous spatial functions is selected to parameterize a formation. At step 702, measurement data is received, and the coefficients of the continuous spatial functions are solved and investigated with a misfit functional that may identify the degree of success with which the chosen continuous spatial functions represent the actual formation. In certain embodiments, a threshold may be set to determine the degree of success necessary to accept the earth model. At step 703 to the misfit functional determination may be compared to the threshold. If the misfit functional determination is below the threshold, the current model with continuous spatial functions may be selected at step 704. If, on the other hand, the misfit functional determination is above the threshold, a different earth model with continuous spatial function may be selected at step 705. The process may then proceed through steps 702 and 703 again. If the process has iteratively selected and applied continuous functions of increasing complexity, and the threshold is still not satisfied, the process may select an earth model with discontinuous spatial functions, similar to the one disclosed above in FIG. 6.

Any of the above described earth modeling techniques may be augmented using a priori information regarding the formation. This may include, for example, a priori information about the interfaces between the formation layers based on existing seismic analysis, adjacent or pilot wells, or well ties. The a priori information may also include information about the resistivity model derived from resistivity analyses of adjacent or pilot wells, or derived from interrogation or analysis of prior electromagnetic (EM) surveys (e.g., marine controlled-source EM surveys; borehole-to-surface EM surveys; and cross-well EM surveys). This a priori information may be incorporated into the earth model, for example, through coefficient weights, regularization, model constraints, and/or model selection.

According to aspects of the present disclosure, the earth modeling techniques described above may be implemented in stand-alone software s or as part of a larger software package via an application programmable interface (API). As used herein, software may comprise a set of instruction stored on a non-transitory computer readable medium that, when execute by a processor, causes the processor to perform certain steps.

According to aspects of the present disclosure, an example method for modeling a geological formation includes receiving a set of measurements from an electromagnetic logging tool and representing at least one characteristic of the geological formation as at least one continuous spatial function. At least one coefficient of the at least one continuous spatial function may be determined based, at least in part, on the set of measurements. At least one characteristic of the geological formation may be determined based, at least in part, on the at least one continuous spatial function.

In certain embodiments, the electromagnetic logging tool comprises an induction logging tool. In certain embodiments, the method further includes steering a drilling assembly based, at least in part, on the determined characteristic of geological formation. In certain embodiments, the at least one characteristic of the geological formation comprises at least one of distance to bed boundary, resistivity, horizontal resistivity, vertical resistivity, anisotropy ratio, permittivity, and chargeability. In certain embodiments, the at least one continuous spatial function comprises at least one of a one-dimensional continuous spatial function and a two-dimensional continuous spatial function. In certain embodiments, the at least one continuous spatial function comprises at least one of a spline, polynomial function, and power series. In certain embodiments, determining at least one coefficient of the at least one continuous spatial function based, at least in part, on the set of measurements comprises determining at least one coefficient of the at least one continuous spatial function based, at least in part, on an inversion of the set of measurements.

In certain embodiments, determining at least one characteristic of the geological formation based, at least in part, on the continuous spatial function comprises determining at least one characteristic of the geological formation by evaluating the at least one continuous spatial function corresponding to the at least one characteristic. Determining at least one characteristic of the geological formation by evaluating the at least one continuous spatial function corresponding to the at least one characteristic may comprise generating at least one of a one-dimensional, two-dimensional, and three-dimensional formation model by evaluating the at least one continuous spatial function.

In any embodiment described in the preceding three paragraphs, the method may further comprise determining at least one coefficient characterizing a fault to which at least some of the plurality of continuous spatial functions are knotted. In any embodiment described in the preceding three paragraphs, receiving the set of measurements from an electromagnetic logging tool may comprise receiving at least one of resistivity, conductivity, permittivity, permeability, chargeability, and distance to bed boundary measurements generated within the subterranean formation.

According to aspects of the present disclosure, an example non-transitory computer readable medium may comprise a set of instruction that, when executed by a processor of the computer, cause the processor to receive a set of measurements from an electromagnetic logging tool and represent at least one characteristic of the geological formation as at least one continuous spatial function. One or more coefficients of at least one continuous spatial functions may be determined based, at least in part, on the set of measurements. A characteristic of the geological formation may be determined based, at least in part, on the at least one continuous spatial functions.

In certain embodiments, the electromagnetic logging tool comprises an induction logging tool. In certain embodiments, the set of instructions further cause the processor to steer a drilling assembly based, at least in part, on the determined characteristic of geological formation. In certain embodiments, the at least one characteristic of the geological formation comprises at least one of distance to bed boundary, resistivity, horizontal resistivity, vertical resistivity, anisotropy ratio, permittivity, and chargeability. In certain embodiments, the at least one continuous spatial function comprises at least one of a one-dimensional continuous spatial function and a two-dimensional continuous spatial function. In certain embodiments, the at least one continuous spatial function comprises at least one of a spline, polynomial function, and power series. In certain embodiments, the set of instructions that cause the processor to determine at least one coefficient of the at least one continuous spatial function based, at least in part, on the set of measurements further causes the processor to determine at least one coefficient of the at least one continuous spatial function based, at least in part, on an inversion of the set of measurements.

In certain embodiments, the set of instructions that cause the processor to determine at least one characteristic of the geological formation based, at least in part, on the continuous spatial function further causes the processor to determine at least one characteristic of the geological formation by evaluating the at least one continuous spatial function corresponding to the at least one characteristic. In certain embodiments, the set of instructions that cause the processor to determine at least one characteristic of the geological formation by evaluating the at least one continuous spatial function corresponding to the at least one characteristic further cause the processor to generate at least one of a one-dimensional, two-dimensional, and three-dimensional formation model by evaluating the at least one continuous spatial function.

In any one of the embodiments described in the preceding three paragraphs, wherein the set of instructions may further cause the processor to determine at least one coefficient characterizing a fault to which at least some of the plurality of continuous spatial functions are knotted. In any one of the embodiments described in the preceding three paragraphs, wherein the set of instructions that cause the processor to receive the set of measurements from an electromagnetic logging tool may further cause the processor to receive at least one of resistivity, conductivity, permittivity, permeability, chargeability, and distance to bed boundary measurements generated within the subterranean formation.

Therefore, the present disclosure is well-adapted to carry out the objects and attain the ends and advantages mentioned as well as those which are inherent therein. While the disclosure has been depicted and described by reference to exemplary embodiments of the disclosure, such a reference does not imply a limitation on the disclosure, and no such limitation is to be inferred. The disclosure is capable of considerable modification, alteration, and equivalents in form and function, as will occur to those ordinarily skilled in the pertinent arts and having the benefit of this disclosure. The depicted and described embodiments of the disclosure are exemplary only, and are not exhaustive of the scope of the disclosure. Consequently, the disclosure is intended to be limited only by the spirit and scope of the appended claims, giving full cognizance to equivalents in all respects. The terms in the claims have their plain, ordinary meaning unless otherwise explicitly and clearly defined by the patentee.

What is claimed is:

1. A method for modeling a geological formation, comprising:
receiving a set of measurements from an electromagnetic logging tool;
representing at least one characteristic of the geological formation as at least one continuous spatial function, wherein the at least one continuous spatial function comprises one or more two-dimensional spline meshes, wherein one or more nodes of the at least one continuous spatial function is associated with at least one of the one or more two-dimension spline meshes;
determining based on the set of measurements at least one coefficient of at least one node of the one or more nodes associated with the at least one of the one or more two-dimensional spline meshes based, at least in part, on the set of measurements;
generating a model based on a weighted sum of the at least one coefficient and one or more coefficients of one or more adjacent nodes to the at least one node;

determining at least one characteristic of the geological formation based, at least in part, on the at least one continuous spatial function;

solving the at least one coefficient with a misfit functional;

detecting that a determination of the misfit functional does not satisfy a threshold for a degree of success with which the at least one continuous spatial function represents the geological formation; and in response to the detecting, selecting an alternative continuous spatial function to represent the at least one characteristic of the geological formation, to achieve a higher degree of success as compared to the at least one continuous spatial function in representing the geological formation.

2. The method of claim 1, wherein the electromagnetic logging tool comprises an induction logging tool.

3. The method of claim 1, further comprising steering a drilling assembly based, at least in part, on the determined at least one characteristic of geological formation.

4. The method of claim 1, wherein the at least one characteristic of the geological formation comprises at least one of distance to bed boundary, resistivity, horizontal resistivity, vertical resistivity, anisotropy ratio, permittivity, and chargeability.

5. The method of claim 1, wherein determining at least one coefficient of the at least one continuous spatial function based, at least in part, on the set of measurements comprises determining at least one coefficient of the at least one continuous spatial function based, at least in part, on an inversion of the set of measurements.

6. The method of claim 1, wherein determining at least one characteristic of the geological formation based, at least in part, on the at least one continuous spatial function comprises determining at least one characteristic of the geological formation by evaluating the at least one continuous spatial function corresponding to the at least one characteristic.

7. The method of claim 6, wherein determining at least one characteristic of the geological formation by evaluating the at least one continuous spatial function corresponding to the at least one characteristic comprises generating at least one of a one-dimensional, two-dimensional, and three-dimensional formation model by evaluating the at least one continuous spatial function.

8. The method of claim 1, further comprising determining at least one coefficient characterizing a fault to which at least one of the at least one continuous spatial function is knotted.

9. The method of claim 1, wherein receiving the set of measurements from an electromagnetic logging tool comprises receiving at least one of resistivity, conductivity, permittivity, permeability, chargeability, and distance to bed boundary measurements generated within the geological formation.

10. A non-transitory computer readable medium comprising a set of instructions that, when executed by a processor of a computer, cause the processor to:

receive a set of measurements from an electromagnetic logging tool;

represent at least one characteristic of a geological formation as at least one continuous spatial function, wherein the at least one continuous spatial function comprises one or more two-dimensional spline meshes, wherein one or more nodes of the at least one continuous spatial function is associated with at least one of the one or more two-dimension spline meshes; and determine based on the set of measurements one or more coefficients of at least one node of the one or more nodes associated with the at least one of the one or more two-dimensional spline meshes based, at least in part, on the set of measurements;

generate a model based on a weighted sum of at least one coefficient and one or more coefficients of one or more adjacent nodes to the at least one node; and determine a characteristic of the geological formation based, at least in part, on the at least one continuous spatial function;

solving the at least one coefficient with a misfit functional;

detecting that a determination of the misfit functional does not satisfy a threshold for a degree of success with which the at least one continuous spatial function represents the geological formation; and in response to the detecting, selecting an alternative continuous spatial function to represent the at least one characteristic of the geological formation, to achieve a higher degree of success as compared to the at least one continuous spatial function in representing the geological formation.

11. The non-transitory computer readable medium of claim 10, wherein the electromagnetic logging tool comprises an induction logging tool.

12. The non-transitory computer readable medium of claim 10, wherein the set of instructions further cause the processor to steer a drilling assembly based, at least in part, on the determined characteristic of the geological formation.

13. The non-transitory computer readable medium of claim 10, wherein the at least one characteristic of the geological formation comprises at least one of distance to bed boundary, resistivity, horizontal resistivity, vertical resistivity, anisotropy ratio, permittivity, and chargeability.

14. The non-transitory computer readable medium of claim 10, wherein the set of instructions that cause the processor to determine at least one coefficient of the at least one continuous spatial function based, at least in part, on the set of measurements further causes the processor to determine at least one coefficient of the at least one continuous spatial function based, at least in part, on an inversion of the set of measurements.

15. The non-transitory computer readable medium of claim 10, wherein the set of instructions that cause the processor to determine at least one characteristic of the geological formation based, at least in part, on the at least one continuous spatial function further causes the processor to determine at least one characteristic of the geological formation by evaluating the at least one continuous spatial function corresponding to the at least one characteristic.

16. The non-transitory computer readable medium of claim 15, wherein the set of instructions that cause the processor to determine at least one characteristic of the geological formation by evaluating the at least one continuous spatial function corresponding to the at least one characteristic further cause the processor to generate at least one of a one-dimensional, two-dimensional, and three-dimensional formation model by evaluating the at least one continuous spatial function.

17. The non-transitory computer readable medium of claim 10, wherein the set of instructions further cause the processor to determine at least one coefficient characterizing a fault to which at least one of the at least one continuous spatial function are knotted.

18. The non-transitory computer readable medium of claim 10, wherein the set of instructions that cause the processor to receive the set of measurements from an electromagnetic logging tool further causes the processor to receive at least one of resistivity, conductivity, permittivity, permeability, chargeability, and distance to bed boundary measurements generated within the geological formation.

* * * * *